(12) United States Patent
Ikake

(10) Patent No.: US 7,124,157 B2
(45) Date of Patent: Oct. 17, 2006

(54) RANDOM NUMBER GENERATOR

(75) Inventor: Katsunori Ikake, Osaka (JP)

(73) Assignee: HMI Co., Ltd., Osaka (JP)

( * ) Notice: Subject to any disclaimer, the term of this patent is extended or adjusted under 35 U.S.C. 154(b) by 728 days.

(21) Appl. No.: 10/148,196

(22) PCT Filed: Oct. 24, 2001

(86) PCT No.: PCT/IB01/01989

§ 371 (c)(1),
(2), (4) Date: Jun. 7, 2002

(87) PCT Pub. No.: WO02/37260

PCT Pub. Date: May 10, 2002

(65) Prior Publication Data

US 2002/0184273 A1    Dec. 5, 2002

(30) Foreign Application Priority Data

Oct. 24, 2000   (JP)   ............................ 2000-324379

(51) Int. Cl.
*G06F 1/02* (2006.01)
(52) U.S. Cl. .................................................. 708/255
(58) Field of Classification Search ................ 708/255
See application file for complete search history.

(56) References Cited

U.S. PATENT DOCUMENTS

| | | | | |
|---|---|---|---|---|
| 4,355,366 A | * | 10/1982 | Porter | 708/255 |
| 4,853,884 A | * | 8/1989 | Brown et al. | 708/3 |
| 5,651,121 A | * | 7/1997 | Davies | 712/200 |
| 5,781,457 A | * | 7/1998 | Cohen et al. | 708/231 |
| 5,830,064 A | * | 11/1998 | Bradish et al. | 463/22 |
| 6,195,669 B1 | * | 2/2001 | Onodera et al. | 708/3 |
| 6,263,353 B1 | * | 7/2001 | Gross et al. | 708/204 |
| 6,760,739 B1 | * | 7/2004 | Takahashi | 708/250 |
| 6,763,364 B1 | * | 7/2004 | Wilber | 708/255 |
| 6,795,837 B1 | * | 9/2004 | Wells | 708/3 |

FOREIGN PATENT DOCUMENTS

| | | |
|---|---|---|
| JP | 166253/1979 | 11/1979 |
| JP | 156134/1981 | 11/1981 |
| JP | 57-45645 | 3/1982 |
| JP | 1-189726 | 7/1989 |
| JP | 2-145010 | 6/1990 |
| JP | 8-212165 | 8/1996 |
| JP | 8-305551 | 11/1996 |
| JP | 2000-66592 | 3/2000 |
| JP | 2000-66879 | 3/2000 |
| JP | 2000-181686 | 6/2000 |
| JP | 2000-276329 | 10/2000 |
| JP | 2001-166920 | 6/2001 |

* cited by examiner

*Primary Examiner*—Tan V. Mai
(74) *Attorney, Agent, or Firm*—Oblon, Spivak, McClelland, Maier & Neustadt, P.C.

(57) ABSTRACT

A random number generator having a simple construction which generates physical random numbers necessary for encryption. The random number generator has an amplifier to amplify noise signals generated from a noise source and digitizer to digitize the amplified noise signals. The digitizer includes a serial register.

15 Claims, 8 Drawing Sheets

Noise signal

Sampling clock

RANDOM NUMBER GENERATOR

TECHNICAL FIELD

The present invention relates to a random number generator.

BACKGROUND ART

Random numbers are necessary for data encryption. Random numbers include so-called pseudo-random numbers which are generated by programs and the pseudo-random numbers are commonly used.

However, the pseudo-random numbers are not suitable for encryption because rules for generating such pseudo-random numbers can be easily estimated. In terms of security, genuine random numbers with no generation rule are more preferable.

Random phenomena occurred in nature may be used as physical random numbers. And it is necessary to have a physical random number generator with a simple structure which can provide random numbers to personal computers or portable terminals for various applications including encryption programs for confidential documents, games, electronic authentication, and numeral simulation (Monte Calro method) and the like.

The present invention has been accomplished in view of the above problem, and it is an object of the invention to provide a random number generator with a simple structure to generate physical random numbers necessary for encryption.

DISCLOSURE OF THE INVENTION

In order to solve the above problem, the invention employs the following technical means. According to the invention, there is provided a random number generator having an amplifier to amplify noise signals generated by a noise source, and a digitizer to digitize the amplified noise signals, wherein the digitizer comprises a serial register. Physical random numbers can be obtained by generating random numbers from noise signals generated by a noise source. Since the serial register is employed as the digitizer to digitize noise signals amplified by the amplifier, it is easy to generate binary numbers with a stable, and simple structure.

Preferably, the random number generator comprises a serial-parallel converter which converts serial digital physical random numbers output from the serial register to parallel signals of certain bits, so that the random number data can be obtained as parallel signals.

Preferably, the random number generator comprises a bit masking section which can mask and output some of the bits of the generated random number data in order to adjust the probability of the random numbers.

Preferably, the bit masking section may mask bits specified by an external device, so that the probability can be altered at discretion. Such random number generator is useful for machines which need random numbers with varying probability, such as Pachinko machines.

Preferably, the random number generator comprises a memory to store the generated random number data in the apparatus, so that the random number data can be reviewed later.

More preferably, the memory stores the random number data output to an external device in response to a request from the external device to output such data.

Preferably, the random number generator comprises a memory to register IDs for electronic user authentication.

The noise generated by the noise source may be thermal noise of a semiconductor.

Preferably, the random number generator comprises an external interface section to output the random number data in response to a request from an external computer, and more preferably, the random number generator is configured as a one-chip IC device.

BEST MODE FOR CARRYING OUT THE INVENTION

An embodiment of the invention will now be described with reference to the attached drawings.

Figure 1:
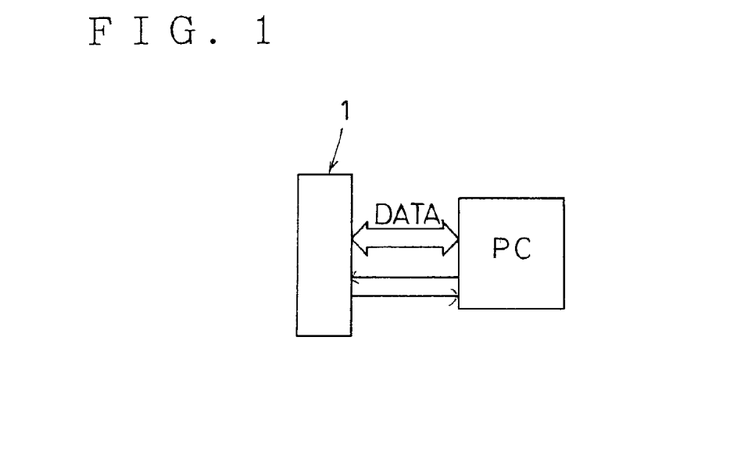
FIG. 1 is a conceptual diagram illustrating a random number generator (one-chip IC device) connected to a personal computer, according to the invention.

Random number generator 1 according to the invention can output random numbers to an external device. As shown in FIG. 1, random number generator 1 is configured as a one-chip IC having an interface section connected to data buses of a personal computer (PC) or the like as an external device so as to output random numbers to the personal computer. The random number generator 1 configured as a one-chip IC may be provided on an electronic substrate, which is incorporated in a housing having cables or the like to be connected to the personal computer PC.

Figure 2:
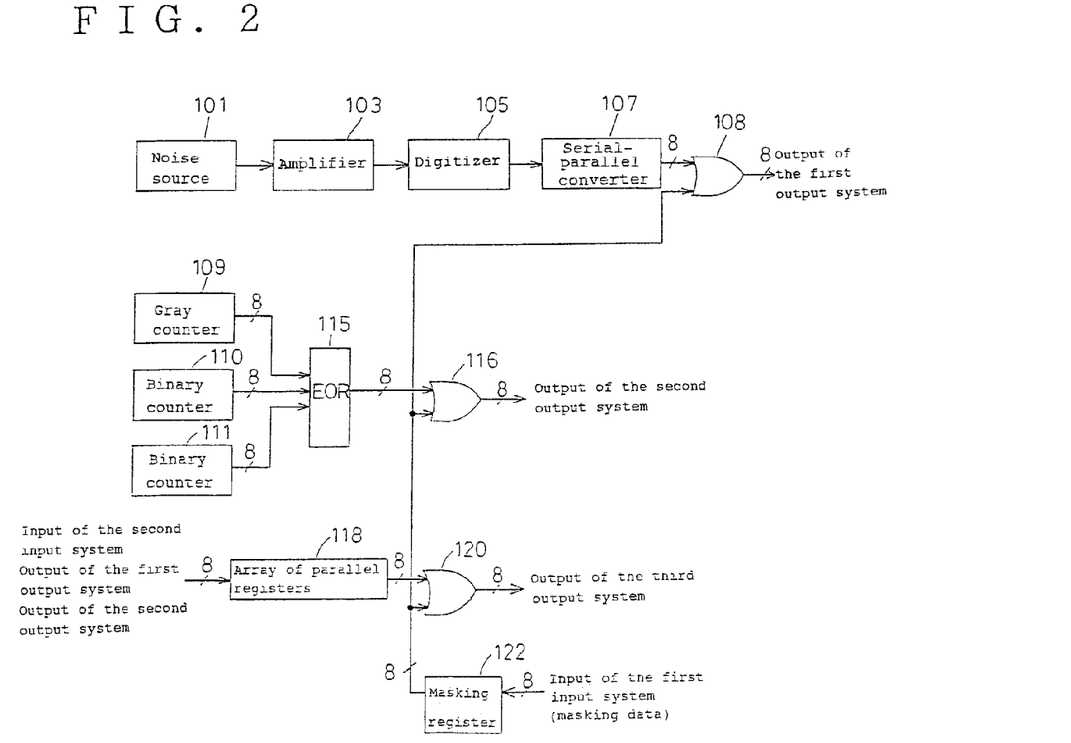
FIG. 2 is a functional block diagram of a random number generator according to the invention.

As shown in FIG. 2, the random number generator 1 has three output systems and two input systems. The output systems/input systems exchange data with the external device PC via a same data bus.

The output of the first output system of the random number generator 1 is an output of a physical random number data. The first output system analog-amplifies thermal noise (white noise) generated in the apparatus (IC), then samples and digitizes the amplified signals to obtain digital numbers to be output as physical random numbers.

The random number generator 1 comprises a noise source 101 to output noise signals, an amplifier 103 to amplify noise signals output from the noise source 101, a digitizer 105 to digitize the amplified noise signals, and a serial-parallel converter 107 to convert the binary number serial signals to parallel signals for the first output system.

The noise source 101 generates thermal noise of a semiconductor as its noise. As the thermal noise of the semiconductor has no periodicity, more random signals can be generated, compared to the pseudo-random numbers. The semiconductor as the noise source 101 is incorporated in the apparatus (IC), and thus no external element is necessary.

Figure 3:
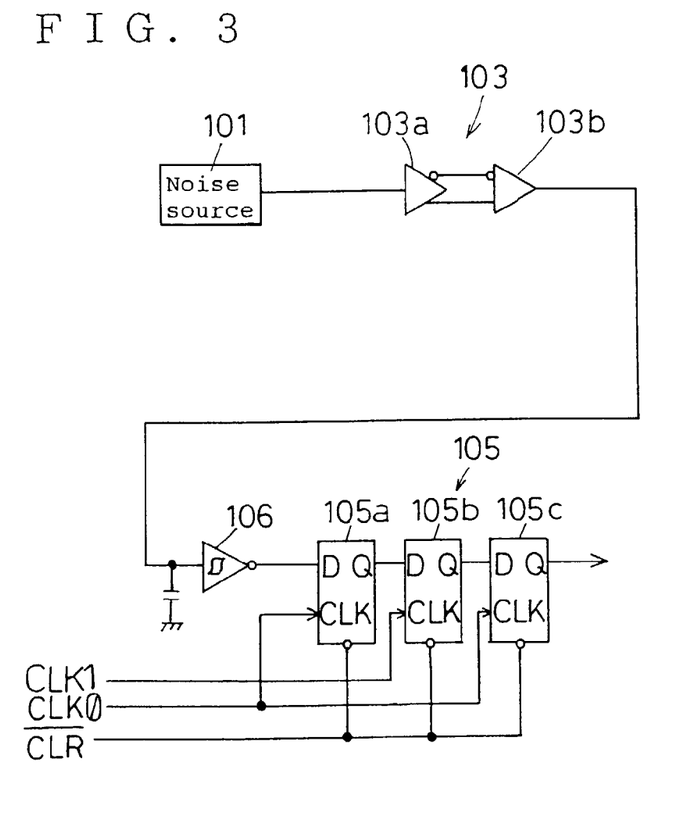
FIG. 3 shows a structure of a physical random number generating section according to the invention.

As shown in FIG. 3, the amplifier 103 amplifies the noise signals to a level where the noise signals can be digitized. The amplifier 103 comprises complementary amplifiers. Also, the amplifier 103 has two stage structure in which a first stage 103a amplifies by 40 dB, and a second stage 103b amplifies by 20 dB.

The amplified noise signals are input into a Schmidt trigger gate 106, and then output therefrom as rectangular waves having pulse width according to the magnitude of the noise signals. The Schmidt trigger is a circuit which raises (or falls) the output pulse when the value of the incoming voltage (noise signal) is on or above a certain value, and falls (or raises) the output pulse when the value of the incoming voltage is on or below another certain value.

Thus, by the Schmidt trigger gate 106 analog noise signals are converted to digital noise signals (TTL level) having a pulse width according to the magnitude of the analog noise signals. In other words, the Schmidt trigger gate 106 serves as a converter to convert noise signals to digital noise signals (TTL level).

The digitizer 105 comprises a serial register 105 (also referred to as "serial shift register") utilizing a sampling clock. Input signal into the serial register 105 is noise signal, and "1" or "0" output from the Schmidt trigger gate 106 is input into the serial register 105. The serial shift register 105 is a serial-in/serial-out shift register, operating at the clocks CLK 0 and CLK 1. The clocks CLK 0 and CLK 1 are clocks divided by a factor of 1/256 of the main clock of the apparatus. The clocks CLK 0 and CLK 1 have a same frequency, but their phases are shifted by half-period to each other.

The serial register 105 comprises three stages (or a plurality of stages) of D flip-flops 105a, 105b, and 105c connected serially. The clock CLK 0 is given to a first stage 105a and a third stage 105c, while the clock CLK 1 is given to a second stage 105b.

Figure 4:
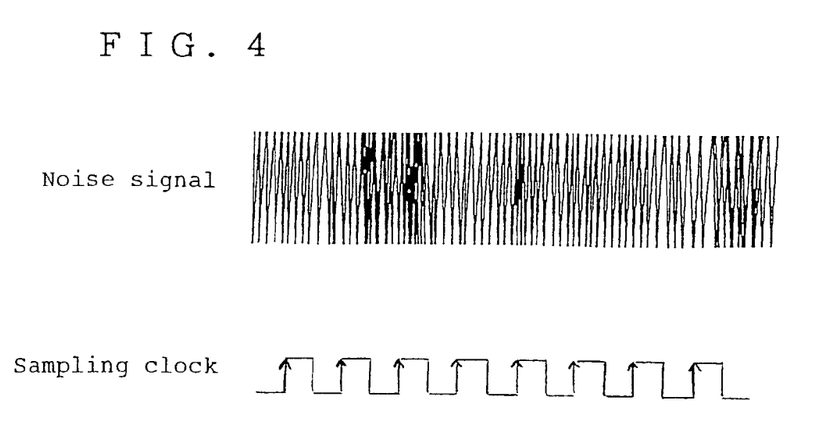
FIG. 4 schematically shows a noise signal and a sampling clock.
Figure 5:
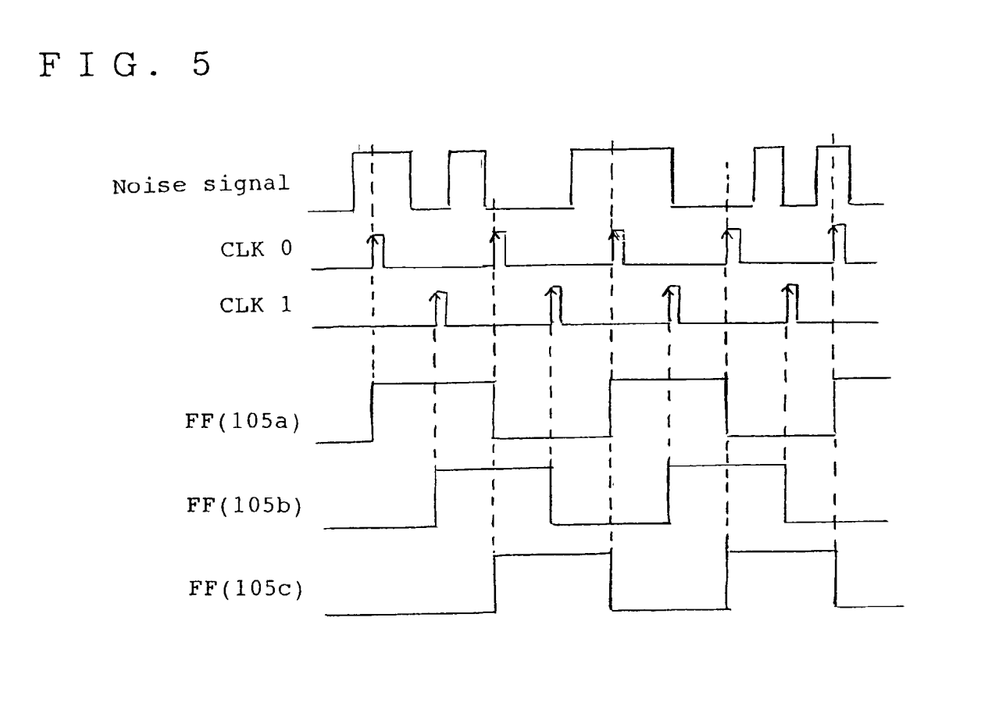
FIG. 5 shows a timing chart to digitize noise signals at a sampling clock.

As shown in FIG. 4, the digitizer 105 digitizes noise signals at the timing of the clock CLK 0 (sampling clock). The operation of the digitizer 105 will be described in detail below. As shown in FIG. 5, the pulses of noise signals output from the Schmidt trigger gate 106 are sampled at rising timings of a clock CLK 0 signal by the D flip-flop 105a of the first stage. An output Q of the D flip-flop 105a of the first stage is "1" or "0", which is a quantitative (sampled) value at the timing of the clock CLK 0 as the sampling clock.

The output of the D flip-flop 105a of the first stage shifts to the second stage 105b at a rising timing of the clock CLK 1 of which period is shifted from that of the clock CLK 0 by half a period.

At the next rising timing of the CLK 0, the D flip-flop 105a of the first stage again samples noise signals, and the output of the D flip-flop 105b of the second stage shifts to the third stage 105c, namely, it is output from the serial register 105.

The above operation occurs repeatedly, and the result of the sampling by the first stage 105a appears as outputs of the serial register 105 with delay of one period relative to the period of the clock CLK 0. The noise signals are random signals, so that digital physical random numbers synchronized to the sampling CLK can be obtained through digitization of such noise signals.

Figure 6:
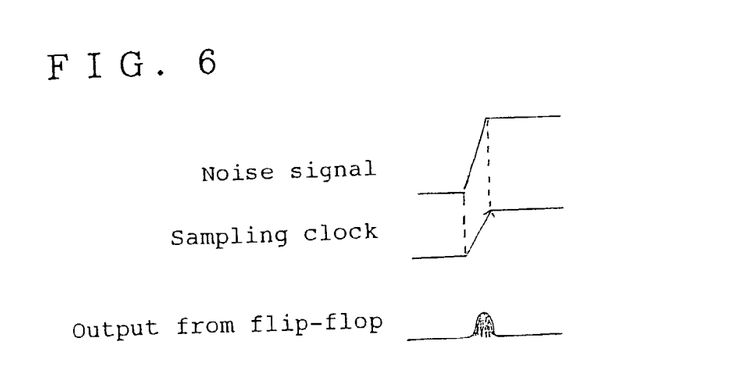
FIG. 6 schematically shows generation of a grig.

Also, shifting and outputting of the sampling value with the shift register 105 result in the following effect. When the timing of the sampling CLK substantially matches to the rising (or falling) of the noise signal as shown in FIG. 6, a grig may occur at the output of the flip-flop 105a (set up failure). However, by shifting the sampling value to the second stage 105b and the third stage 105c, such grig can be cancelled from the output of the serial shift register 105, leading to stabilized output.

In addition, the above described digitizer 106 enables digitization in a simple structure, and thereby the system can be more simplified and easily configured as a one-chip IC.

As shown in FIG. 2, the digitized serial random number signals are converted to parallel signals by the serial parallel converter 107. These parallel signals are 8 bits data, with 256 values as random numbers (values from 0 to 255).

The random number signals (physical random number data) altered to 8 bits parallel signals, will be output from the first system via a bit masking section 108.

The bit masking section 108 masks (fixes to 1 or 0) some bits of the 8 bits random number data, as necessary. In the embodiment shown in FIG. 7, the bit masking section 108 comprises OR circuits of the same number as bits of the random number data (8). The bit masking section 108 masks certain bits of the random number data by taking logical addition of the value of each bit of the random number data and the value of each bit of a masking register 122. Namely, as shown in the masking register 122 of FIG. 7, when the three most significant bits (fifth bit, sixth bit, and seventh bit) are set to 1 and the other bits are set to 0, the masking bit section 108 outputs random data with the three most significant bits (fifth bit, sixth bit, and seventh bit) having fixed value of 1, and the other bits having value of the random number data itself.

Figure 7:
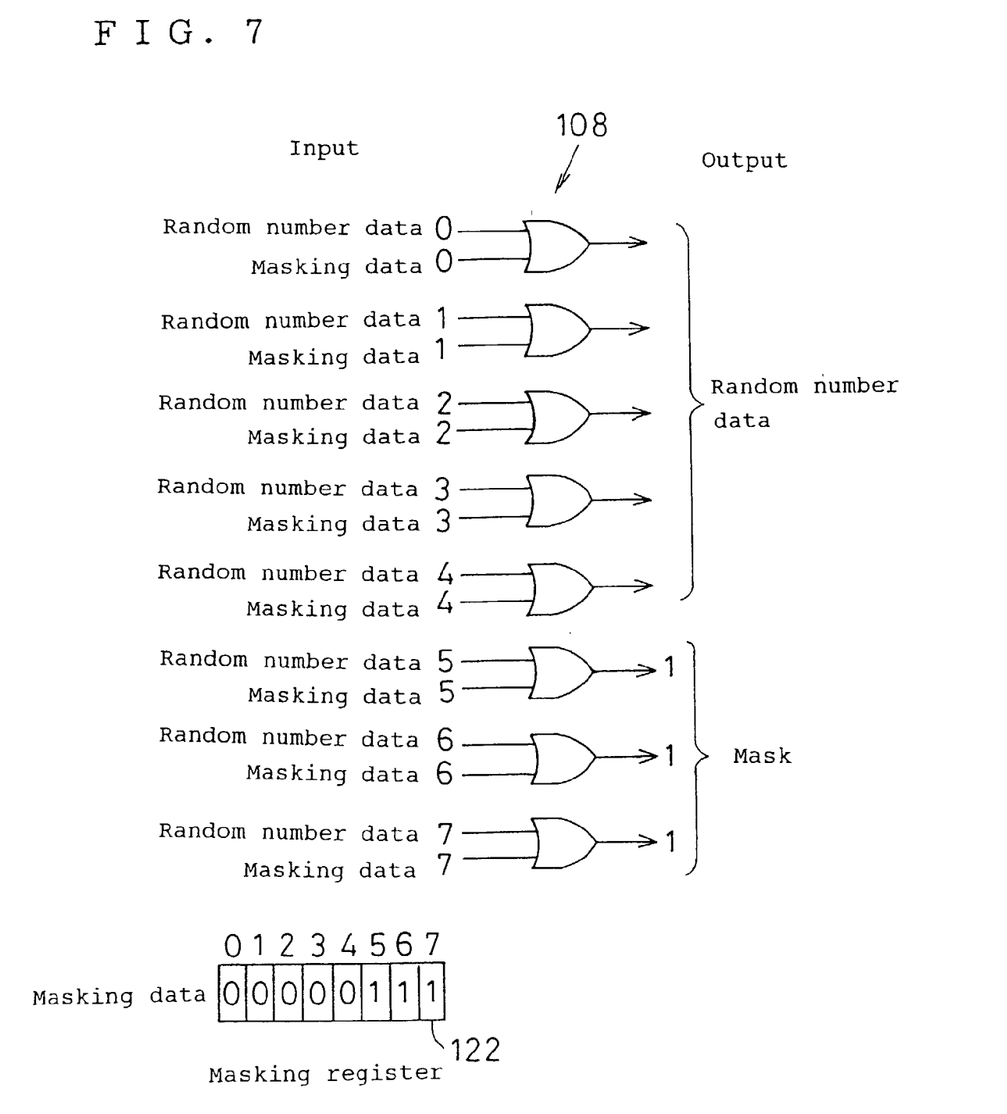
FIG. 7 shows a circuit diagram of a bit masking section and data contents of a masking register.

In this case, the effective bits will be the least significant five bits of the 8 bits of the random data output from the bit masking section 108, and the random numbers will have 32 values. Thus, the bit masking section 108 can adjust probability of occurrence of the random numbers. This feature is suitable for applications requiring random numbers with varying probability of occurrence, such as the game machines like Pachinko.

The data of masking register 122 can be set from an external device, as is described below.

In the second output system of the random number generator 1, a plurality of counter outputs are input into serial exclusive OR chain structure circuits, and any eight bits are output as the counter output from the circuits. Although the signal obtained by the second output system basically depends on the counter, a plurality of counter outputs are mixed to make random values by an algorithm comprising exclusive OR circuits, so that the signals obtained by the second output system can be used as random numbers.

The random number generator 1 comprises three counters 109, 110, 111, and a data mixing section 115 to mix outputs from each counter for the second output system.

Figure 8:
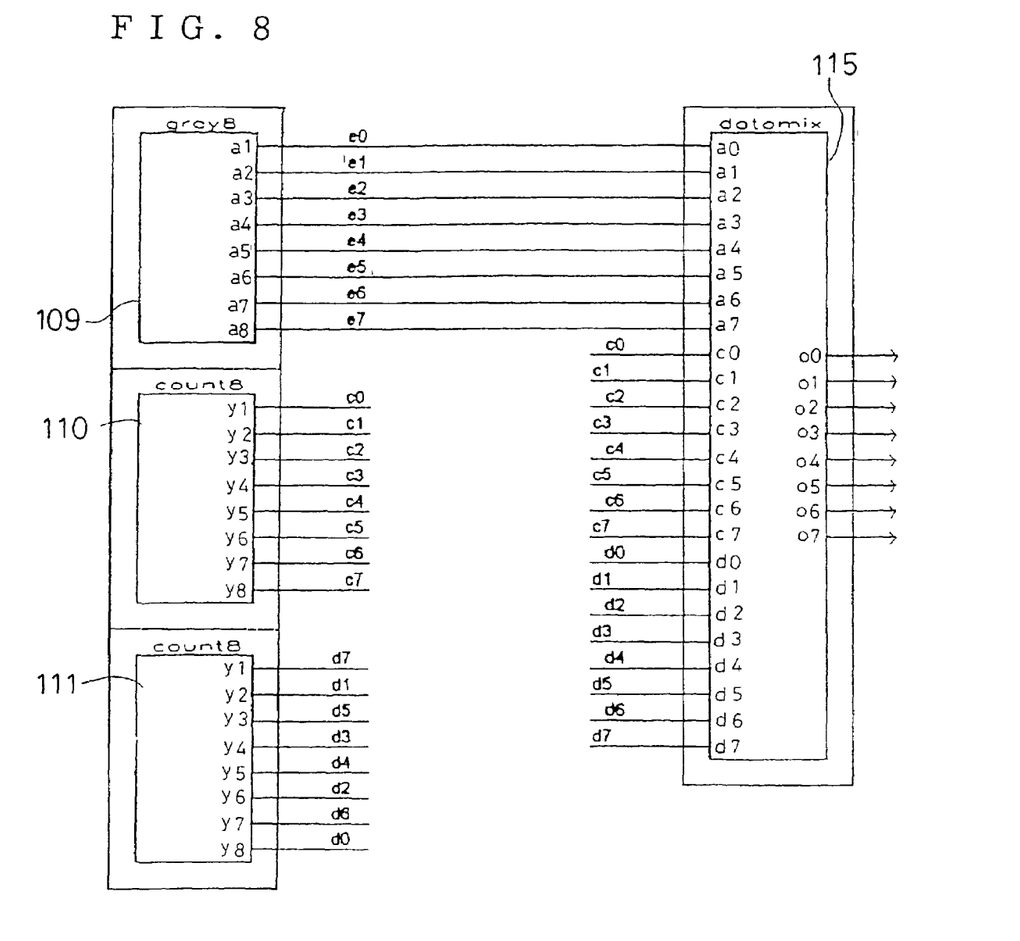
FIG. 8 is a schematic diagram showing a structure of a counter.

As shown in FIG. 8, the counter comprises one gray counter 109 and two binary counters 110 and 111, and each of the counters 109, 110, and 111 has 8 bits output. Each counter operates (counts) at the same clock as clock CLK 0 used in the first system.

Output terminals (a1 to a8) of the gray counter 109 are connected to input terminals (a0 to a7) of the data mixing section 115 by signal lines (e0 to e7), output terminals (y1 to y8) of a first binary counter 110 are connected to input terminals (c0 to c7) of the data mixing section 115 by signal lines (c0 to c7), and output terminals (y1 to y8) of the second binary counter 111 are connected to input terminals (d0 to d7) of the data mixing section 115 by signal lines (d0 to d7).

The data mixing section 115 generates 8 bits output from total 24 bits outputs from each of the counters 109, 110, and 111 via exclusive OR circuits (EOR). The data mixing section 115 comprises chain structure circuits 115a and 115b of a first stage, and a chain structure circuit 115c of a second stage (see FIGS. 9 and 10).

Figure 9:
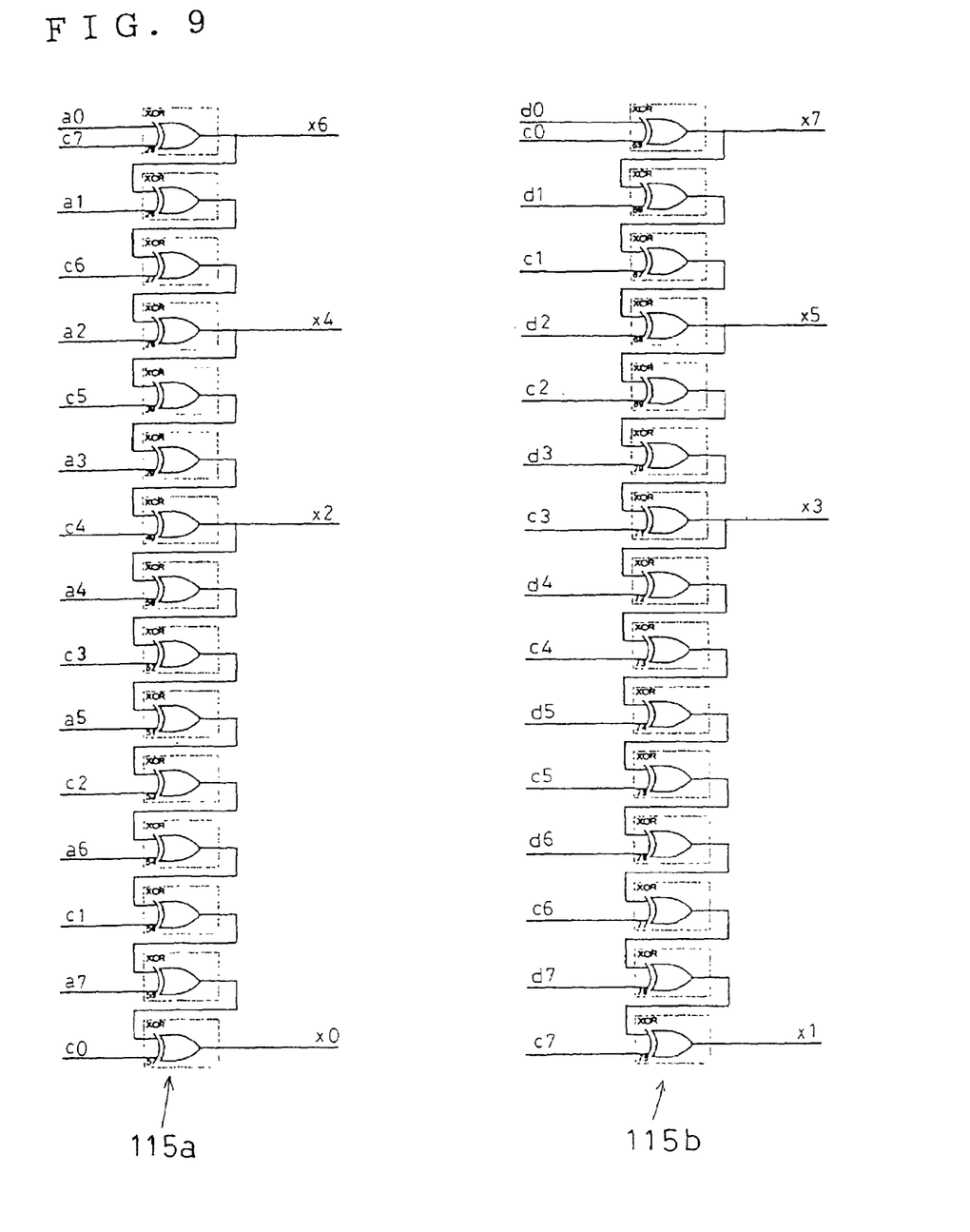
FIG. 9 is a chain structure circuit diagram of a first stage of the counter.

The chain structure circuits of the first stage have a first array of the chain structure circuit 115a and a second array of the chain structure circuit 115b. The first array of the chain structure circuit 115a comprises 15 EOR circuits with two inputs, connected in chain (connected serially). The first array of the chain structure circuit 115a as a whole has 16 inputs (8 bits×2) including two inputs of the first EOR circuit of the chain, and one input of each of the other EOR circuits (inputs not connected to the chain).

The outputs of the gray counter 109 (a1 to a8) and the outputs of the first binary counter 110 (y1 to y8), i.e., the inputs (a0 to a7) and the inputs (c0 to c7) of the data mixing section 115, are given as inputs to the first array of the chain structure circuit 115a. Outputs of the first array of the chain structure circuit 115a can be obtained from outputs of any EOR circuit, and given to the chain structure circuit 115c of the second stage. In FIG. 9, outputs of the first, forth, seventh and last EORs of the chain are used as the outputs of the first array of the chain structure circuit 115a. The output of the first EOR of the chain is x6, the forth output is x4, the seventh output is x2, and the last output is x0, and all of them are given to the chain structure circuit 115c of the second stage.

The second array of the chain structure circuit 115b has same construction as that of the first array of the chain structure circuit. The outputs of the first binary counter 110 (y1 to y8) and the outputs of the second binary counter 111 (y1 to y8) are given as inputs to the second array of the chain structure circuit 115b, namely, the inputs (c0 to c7) and the inputs (d0 to d7) of the data mixing section 115 are given to the circuit 115b. Outputs of first, fourth, seventh and last EORs of the chain are used as outputs of the second array of chain structure circuit 115. The output of the first EOR of the chain is x7, the fourth output is x5, the seventh output is x3, and the last output is x1, and all of them are given to the chain structure circuit 115c of the second stage.

Figure 10:
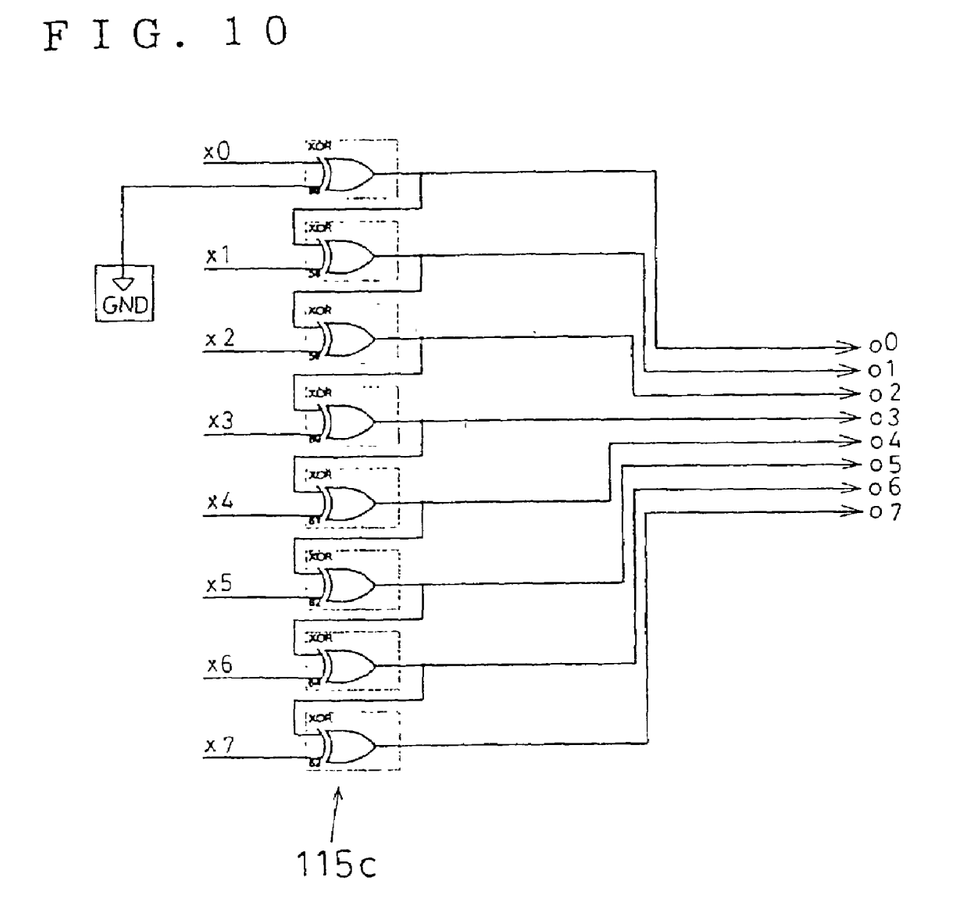
FIG. 10 is a chain structure circuit diagram of a second stage of the counter.
Figure 11:
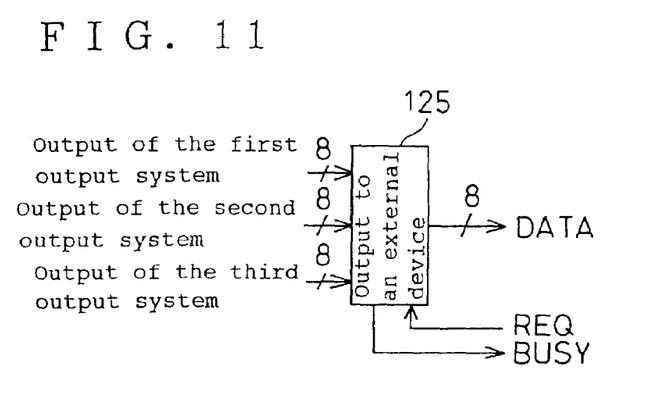
FIG. 11 is an explanatory diagram showing output function of an external interface section.

As shown in FIG. 10, the chain structure circuit 115c of the second stage in which the outputs x0 to x7 of the first array of the chain structure circuit 115a and the second array of the chain structure circuit 115b are input, comprises 8 EOR circuits with two inputs, connected in chain (serially connected), and has 8 inputs as a whole, since one input of the first EOR circuit of the chain is connected to ground GND.

The outputs (o0 to o7) of the chain structure circuit 115c of the second stage are 8 bits, using output of each EOR circuit. The output of the chain structure circuit 115c of the second stage is the output of data mixing section 115 (o0 to o7), i.e., the output of the second system (counter data). This counted data also based on the sampling CLK is a signal synchronized with the sampling CLK.

The output of the second output system can also be bit masked same as the output of the first system. To this end, the second system comprises a bit masking section 116. The bit masking section 116 has the same structure as the bit masking section 108, and masks its output according to the masking data of the masking register 122 to adjust effective number of bits in the output of the second system.

As shown in FIG. 2, the third output system of the random number generator 1 outputs data set in an array of parallel registers (memory) 118. The array of parallel registers 118 comprises an 8 bits register, and connected to write data given by an external device (input of a second input system), the output of the first output system (random number data), or the output of the second output system (counter data).

Users IDs can be written in the array of parallel registers 118 by the external device so as to be stored therein and output therefrom as an output of the third output system, as necessary. In this case, the IDs registered in the array of parallel registers 118 can be used for electronic authentication. Users can write any data including IDs freely in the array of parallel registers 118, while prohibit writing of data to it.

Also, the random number data and the counter data output to an external device can be written into the array of parallel registers 118 (memory) to be stored therein. The stored data can be output as an output of the third output system to an external device, as necessary, and used for data verification or the like.

A memory for data from an external device, and a memory for data output from the first output system or the second output system may be provided separately. Furthermore, a memory for data output from the first output system and a memory for data output from the second system may be provided separately.

The output of the third output system can also be bit masked, same as the output of the first system and the output of the second system. To this end, the third system comprises a bit masking section 120. The bit masking section 120 has the same structure as the bit masking section 108, and masks the output according to the masking data of the masking register 122 to adjust effective bit numbers of the output of the third output system.

The outputs of the above first to third output system are selectively output to an external device via an external interface section 125. The output of the first output system (random number data) and the output of the second output system (counter number) are constantly generated, and the data of the array of parallel registers 118 is always ready to be output as the output of the third output system. The external interface section 125 outputs any one of the outputs to an external device, i.e., to data bus DATA in response to an output request REQ from the external device. Which one of the outputs of the first to third output systems to be output to the external device is determined according to the request from the external device.

When an output request is sent by an external device, e.g., personal computer PC of FIG. 1, the parallel data of one of outputs of the first to third output systems is written in a data output register (not shown), and maintained therein while the data is being read out. In order to protect the data during the read out period, a flag indicating "converting (BUSY)" is output to a request (REQ).

The random number data can be output to an external device as serial signals separately from the parallel output.

Figure 12:
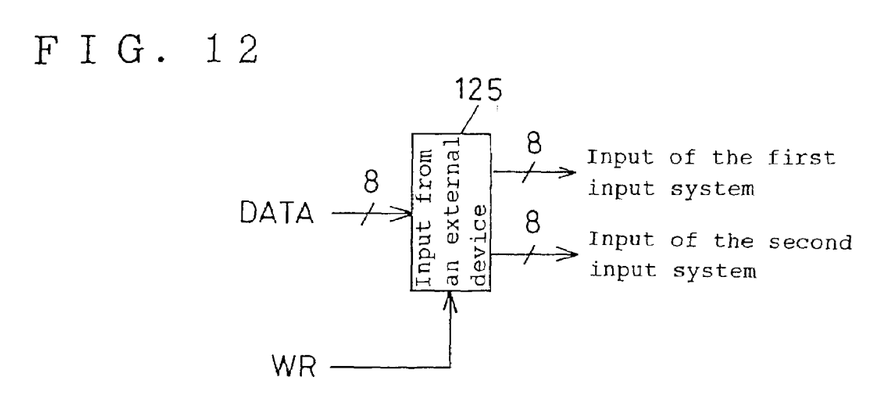
FIG. 12 is an explanatory diagram showing input function of the external interface section.

Also as shown in FIG. 12, the external interface section 125 selectively accepts inputs from an external device. The external interface section 125 has two input systems in which the first input system accepts masking data and the second input system accepts fixed data to be written into the array of parallel registers 118. All inputs are 8 bits, same as all outputs.

When an input is given to the data bus DATA from an external device, e.g., personal computer PC of FIG. 1, and writing signal WR is given to the apparatus, the data from the data bus DATA is written into the array of parallel registers 118 or the masking register 122. Whether the input is for the first input system or for the second input system is instructed by the external device.

As described above, the external interface section 125 is adapted to be connected to an external device such as personal computer PC, so that the external interface section 125 allows the random number generator according to the invention to be incorporated into various apparatuses which are in need of random numbers.

The random number generator 1 according to the invention can be constructed as an encryption system which generates genuine random numbers, and creates keys for encryption to encrypt a clear text using encryption method such as secret key encryption method, or public encryption method. The encryption system of the invention is preferably configured to be connectable to a computer. By connecting such an encryption system to a personal computer, encryption of files in various formats become possible.

INDUSTRIAL APPLICABILITY

According to the invention, the random number generator has an amplifier to amplify noise signals generated from a noise source and a digitizer to digitize the amplified noise signal, wherein the digitizer comprises a serial register, so that physical random numbers necessary for encryption can be obtained with simple structure.

What is claimed is:

1. A random number generator comprising:
   an amplifier configured to amplify noise signals generated from a noise source;
   a digitizer configured to digitize the amplified noise signals; and
   a bit masking section configured to mask some of generated random number data to output other data,
   wherein said digitizer comprises a serial register and said bit masking section masks the bits specified by an external device.

2. The random number generator according to claim 1, further comprising:
   a serial-parallel converter which converts serial digital physical random numbers output from said serial register to parallel signals of certain bits.

3. The random number generator according to claim 1, further comprising:
   a memory configured to store generated random number data in the generator.

4. The random number generator according to claim 3, wherein said memory stores the random number data which are output in response to a request from outside.

5. The random number generator according to claim 1, further comprising:
   a memory configured to store IDs for electronic authentication and generated random number data in the random number generator.

6. The random number generator according to claim 1, wherein said noise of the noise source comprises thermal noise of a semiconductor.

7. The random number generator according to claim 1, further comprising:
   an external interface section configured to output random data in response to a request from an external computer.

8. The random number generator according to claim 1, being configured as a one-chip IC device.

9. A random number generator comprising:
   an amplifier configured to amplify noise signals generated from a noise source;
   a digitizer configured to digitize the amplified noise signals; and
   a memory configured to store IDs for electronic authentication and generated random number data in the random number generator,
   wherein said digitizer comprises a serial register.

10. The random number generator according to claim 9, further comprising:
    a serial-parallel converter which converts serial digital physical random numbers output from said serial register to parallel signals of certain bits.

11. The random number generator according to claim 9, further comprising:
    a memory configured to store generated random number data in the generator.

12. The random number generator according to claim 11, wherein said memory stores the random number data which are output in response to a request from outside.

13. The random number generator according to claim 9, wherein said noise of the noise source comprises thennal noise of a semiconductor.

14. The random number generator according to claim 9, further comprising:
    an external interface section configured to output random data in response to a request from an external computer.

15. The random number generator according to claim 9, being configured as a one-chip IC device.

* * * * *